INVENTORS.
Charles W. Turner
Ezra P. Reineke

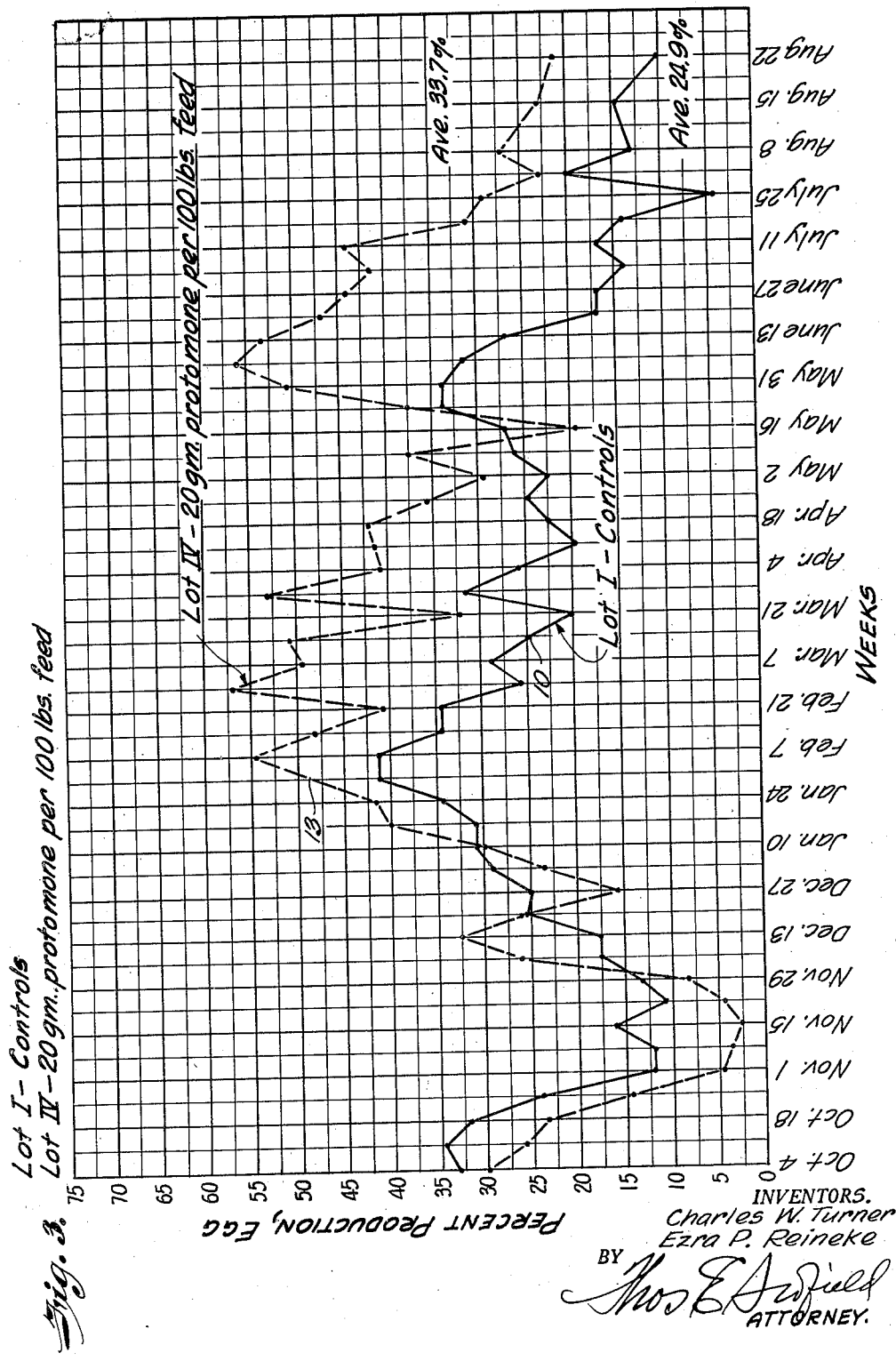

Patented Sept. 18, 1945

2,385,117

UNITED STATES PATENT OFFICE 2,385,117

METHOD OF INCREASING THE EGG PRODUCTION OF FOWLS

Charles W. Turner and Ezra P. Reineke, Columbia, Mo., assignors to American Dairies Incorporated, Kansas City, Mo., a corporation of Maryland, and The Quaker Oats Company, Chicago, Ill., a corporation of New Jersey Application September 11, 1943, Serial No. 501,988

6 Claims. (Cl. 99—4)

Our invention relates broadly to a method of increasing the rate of body growth and egg production of fowls such as chickens, turkeys, ducks and geese. More specifically our invention comprises the feeding of iodinated protein to normal fowls in predetermined critical amounts sufficient to favorably influence directly these processes and indirectly the rate of secretion by the anterior pituitary gland of hormones which influence the metabolic processes favorable to rapid growth and of the gonadotropic and associated hormones favorable to a high level and continued egg production (particularly egg production during seasons of normally low or reduced production). Further the egg production is thus continued at a high level with advancing age whereas normal hens decline following the first year.

This is a continuation-in-part application of our copending applications Serial No. 326,422 filed March 28, 1940, and Serial No. 441,116 filed April 30, 1942, which disclose broadly that a thyroprotein can be given to fowls to increase egg production and growth rate.

We are aware that materials possessing thyroidal activities have heretofore been given to both normal and thyroprivic birds. However, administration of the material to the thyroprivic birds has no significance to this invention nor does the administration to normal birds since, to our knowledge, no one has ever had any conception or appreciation of the critical amounts necessary to obtain our results. The administration of iodinated protein to birds in amounts substantially less than we recommend has little or no effect, while the administration of amounts substantially greater actually causes a decrease in growth and egg production.

Figure 1:
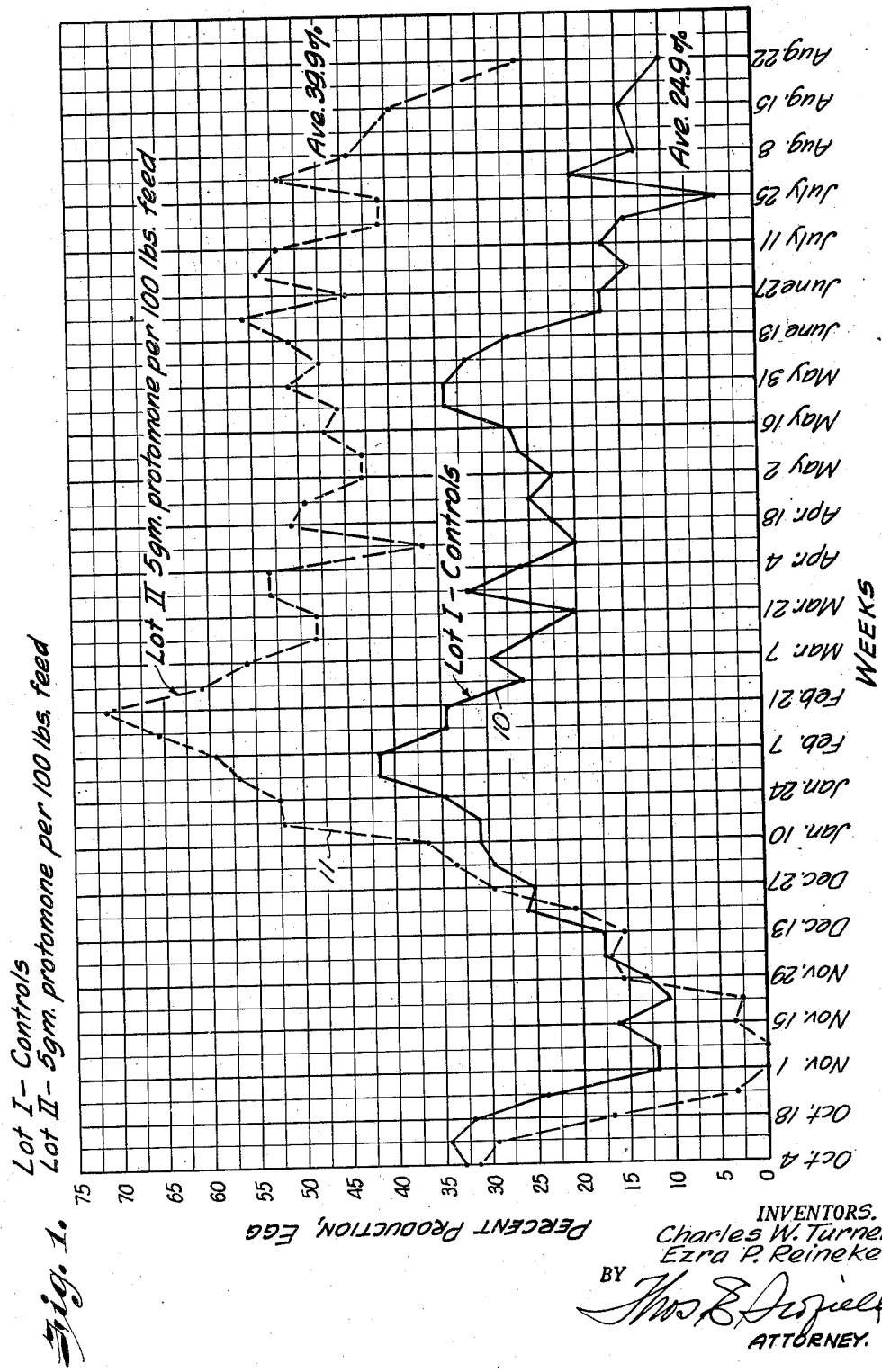
Figure 2:
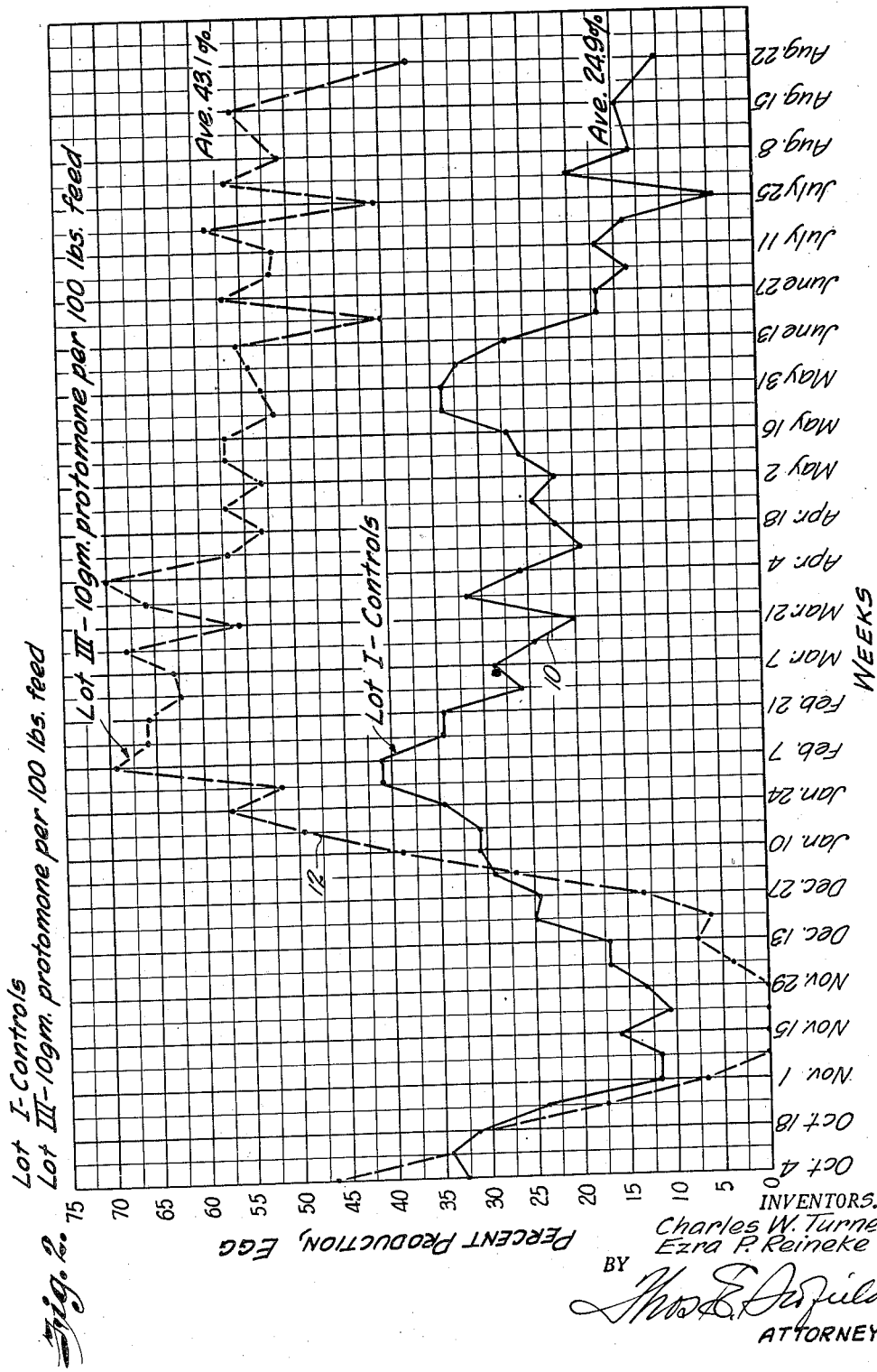

In the drawings forming a part of this specification and wherein like numerals are employed to designate like parts throughout the same, Figs. 1, 2 and 3 are graphs illustrating the effect of varying amounts of iodinated protein upon the egg production of two-year-old hens.

For many purposes it is desirable to effect a rapid growth in young fowls. For example, the meat of fast growing chicks is much more tender than if the growth is retarded and the total feed consumption per pound of gain is less. We are able to effect a very rapid increase in growth as compared with the normal growth by feeding iodinated protein to the growing chicks in amounts within a predetermined critical range. The amount given depends considerably upon the size and age of the bird, but the following table will illustrate the amount which we have found to be critical for growing birds of varying body weight.

TABLE I

| Body wt. in gms. of growing chickens | Daily feed consumption in gms. | Iodinated protein consumption in mg. |
|---|---|---|
| 100 | 10 | 1.0 —— 8.0 |
| 200 | 27 | 2.7 —— 21.6 |
| 500 | 54 | 5.4 —— 43.2 |
| 1,000 | 64 | 6.4 —— 51.2 |
| 1,500 | 71 | 7.1 —— 56.8 |

The iodinated protein used in the experiment described above and in all experiments hereinafter described is 3 per cent as potent as synthetic thyroxine, and it can be administered to the birds in several ways. For example, it can be administered directly to the birds in capsules, but this method is generally unsatisfactory. The iodinated protein can also be coated on lime grit or cracked oyster shells which is then fed to the birds in sufficient quantity so that the requisite amounts of iodinated protein are supplied. However, in practice the iodinated protein is best given in the food ratio. We have found that iodinated protein having 3 per cent the potency of thyroxine should be mixed with the food in amounts between 0.01 per cent and 0.08 per cent. Expressed differently, between 4.5 grams and 36 grams of iodinated proteins are mixed with each 100 pounds of feed. This method of administering the iodinated protein is most efficient and convenient since the amount of iodinated protein to be given is a function of the body weight of the fowl and the amount of food consumed increases proportionately as the bird grows and its weight increases. Thus, the food consumption increases as the body weight increases and since the iodinated protein is required in increasing amounts with increasing body weight, this method of administration is self-regulatory over a broad range of body weight.

The following test is a typical example of the effect produced on growing chicks by the administration of iodinated protein in critical amounts. To conduct the test young White Rock chicks were divided into five groups or lots the day after they were hatched. Each lot contained approximately twenty (20) chicks and included both males and females. As best shown in Table II below, lot 1 received a standard poultry ration containing no iodinated protein. Lot 2 received the same ration containing 0.01 per cent iodinated protein. Lot 3 received the same ration containing 0.02 per cent iodinated protein. Lot 4 received the same ration containing 0.04 per cent iodinated protein, and lot 5 received the same ration containing 0.08 per cent iodinated protein. Obviously the growth of the chicks in lot 1 serves as a criterion for determining the effect of the iodinated protein on the growth rate of the chicks in lots 2, 3, 4 and 5.

TABLE II

*Effect of iodinated protein on growth of White Rock chicks*

| Age in weeks | Lot 1 controls Weight in grams | | Lot 2 iodinated protein, .01% Weight in grams | | Lot 3 iodinated protein, .02% Weight in grams | | Lot 4 iodinated protein, .04% Weight in grams | | Lot 5 iodinated protein, .08% Weight in grams | |
|---|---|---|---|---|---|---|---|---|---|---|
| | 12 males | 6 females | 10 males | 10 females | 10 males | 10 females | 10 males | 10 females | 10 males | 10 females |
| 0 | 43 | 42 | 43 | 41 | 41 | 42 | 41 | 43 | 44 | 42 |
| 2 | 80 | 81 | 89 | 85 | 86 | 74 | 88 | 87 | 87 | 87 |
| 4 | 193 | 184 | 222 | 215 | 208 | 190 | 220 | 211 | 224 | 210 |
| 6 | 420 | 387 | 465 | 415 | 430 | 386 | 437 | 440 | 516 | 425 |
| 8 | 734 | 656 | 754 | 632 | 681 | 601 | 658 | 708 | 782 | 643 |
| 10 | 998 | 893 | 1,045 | 890 | 892 | 880 | 994 | 917 | 1,145 | 927 |
| 12 | 1,331 | 1,190 | 1,354 | 1,161 | 1,370 | 1,175 | 1,305 | 1,215 | 1,440 | 1,179 |

It will be observed that the chicks in lots 2, 3, 4 and 5 either equalled or exceeded growth rate of the controls (lot 1) during the first six weeks. The forty male chicks in lots 2, 3, 4 and 5 averaged 10 per cent more in body weight than the male chicks in lot 1. The female chicks in lots 2, 3, 4 and 5 averaged 7.5 per cent more in body weight than the female chicks in lot 1. During the last six weeks the rate of growth of lots 2, 3, and 4 was reduced somewhat, but the males in lot 5 which received 0.08 per cent of iodinated protein continued to grow more rapidly than the control birds in lot 1. This clearly demonstrates that the chick growth reached its optimal level when the feed contained 0.08 per cent of iodinated protein.

In addition to the above, we found that the feather growth on the birds in lots 2, 3, 4 and 5 was much improved, the degree of improvement being directly proportional to the amount of iodinated protein received. Further tests have demonstrated that improved feather growth is obtained when 0.10 per cent of iodinated protein is added to the feed. This is the equivalent of 45 grams of iodinated protein per one hundred (100) pounds of feed. However, when this high percentage of iodinated protein is employed the gain in body weight was about normal and in some cases slightly below normal.

To increase the egg production of pullets or hens the iodinated protein must be given in amounts somewhat less than the amounts causing a maximum growth increase. In general, a maximum increase in egg production is obtained when from 0.01 per cent to 0.04 per cent iodinated protein is added to the feed. This is the equivalent of from 4.5 grams to 18 grams per one hundred (100) pounds of feed. The actual daily consumption of iodinated protein by hens of varying body weight is shown in Table III.

TABLE III

| Body wt. in gm. of laying hens | Daily feed consumption in gm. | Daily iodinated consumption in mg. |
|---|---|---|
| 2,000 | 95.0 | 9.5 ---- 38 |
| 2,500 | 118.75 | 11.9 --- 47.5 |
| 3,000 | 142.50 | 14.25 -- 57 |

Although iodinated protein may be used to good effect to stimulate egg production in mature birds, if started at any season of the year, we prefer to start the treatment in late summer or early autumn when the birds are brought in from the range and placed in laying houses. If thyroidal stimulation of mature birds is begun at this time the normal moult is hastened and heavy egg production begins at an earlier date. Egg production will remain at or near the maximal level with little or none of the seasonal fluctuation normal in non-treated birds as long as the iodinated protein treatment or feeding is continued.

If iodinated protein is not fed to the pullets or hens until their second year, the birds will begin to moult immediately and a rapid growth of new feathers occurs. During moulting egg production will decline. However, upon the completion of the new feather growth egg production gradually increases and remains at a high level throughout the year.

If female chicks are fed 0.08 per cent of iodinated protein, the amount recommended for maximal body growth to twelve weeks of age, it is necessary to reduce gradually the amount of iodinated protein to approximately 0.02 to 0.04 per cent if the young pullet is to produce a maximal egg yield. When this is done, little moulting occurs and the egg yield is considerably higher than in the case of untreated pullets of corresponding size and age. The following test, as illustrated in Table IV and Figs. 1, 2 and 3 of the drawings, is typical of the effect which various amounts of iodinated protein has upon the egg production of young hens. To conduct the test, forty-eight two-year-old hens were divided into four groups of twelve hens each. In order that an accurate check be maintained on the egg production of the respective groups or lots of birds each lot was placed in a separate laying battery having an individual compartment for each hen. All of the birds were fed a ration comprising the following constituents:

| | | |
|---|---|---|
| Ground yellow corn meal | lbs | 350 |
| Ground wheat | lbs | 200 |
| Ground oats | lbs | 100 |
| Wheat bran | lbs | 100 |
| Alfalfa leaf meal | lbs | 80 |
| Meat scraps | lbs | 80 |
| Dried buttermilk | lbs | 25 |
| Soybean oil meal | lbs | 30 |
| Cod liver oil | pints | 10 |
| Salt | lbs | 5 |
| Finely ground limestone | lbs | 20 |
| | lbs | 1000 |

The birds in lot 1 received the above ration containing no iodinated protein. The birds in lot 2 received the above ration containing approximately 0.01 per cent iodinated protein (5 grams of iodinated protein per 100 pounds of feed). The birds in lot 3 received the above ration containing approximately 0.022 per cent of iodinated protein (10 grams of iodinated protein per 100 pounds of feed). Lot 4 received the above ration containing approximately 0.04 per cent iodinated protein (20 grams of iodinated protein per 100 pounds of feed).

All four lots of hens moulted shortly after being placed in the laying batteries but the birds receiving the iodinated protein all moulted at once and much more rapidly than the untreated birds. During the moult the egg production of the birds in lots 2, 3, and 4 dropped below the egg production of the controls in lot 1. However, after moulting the egg production of the hens receiving the iodinated protein rapidly passed the egg production of the untreated controls. This was particularly true of the birds in lots 2 and 3. The egg production of the birds in lot 3 was outstanding, showing that maximal egg production is obtained when approximately 10 grams of iodinated protein per one hundred (100) pounds of feed is administered.

Referring now to Fig. 1 wherein the average percentage egg production of the birds in lots 1 and 2 respectively is plotted graphically, the abscissa numbers are the dates upon which the respective egg productions were computed and the ordinate numbers depict the average weekly percentage production of eggs observed on the respective dates. The percentage egg production is obtained by comparing the actual production with the possible, i. e., one per day. Line 10 shows the weekly percentage egg production of the control birds in lot 1 and line 11 shows the average weekly percentage egg production of the birds in lot 2. The test period extended from October 4 to August 22. During this period the percentage egg production of the controls was 24.9 as compared with the percentage egg production of lot 2 which was 39.9.

Attention is now directed to Fig. 2 which is similar to Fig. 1 except that the average weekly percentage egg production of the birds in lot 3 is compared graphically with the average weekly percentage egg production of the control birds in lot 1. As in the preceding figure, line 10 shows the percentage egg production of the controls. Line 12 depicts the average weekly percentage egg production of the birds in lot 3. In this case the record of the treated birds is even more significant since they produced almost twice as many eggs as the controls. The percentage egg production of the birds in lot 3 for the test period was 43.1 as compared with the showing of the controls which was only 24.9.

Referring now to Fig. 3 which is substantially identical with Figs. 1 and 2 except that the average weekly percentage egg production of the birds in lot 4 is plotted against the average weekly percentage egg production of the controls in lot 1. As in the previous figures, line 10 represents the average weekly percentage egg production of the controls. Line 13 depicts the average weekly percentage egg production of the birds in lot 4. It is interesting to note that the average egg production of the birds receiving 20 grams of iodinated protein per 100 grams of feed was less than the birds receiving less iodinated protein but still considerably greater than the birds receiving no iodinated protein at all. The average percentage egg production of the birds in lot 4 for the test period was 33.7 as compared with 24.9 for the birds in lot 1. As suggested, the above tests establish that the optimal amount of iodinated protein for egg production is in the order of 10 grams of iodinated protein per 100 pounds of feed. However, good results were also obtained when the birds received as little as 5 grams of iodinated protein per 100 pounds of feed or as much as 20 grams of iodinated protein per 100 pounds of feed. The results indicate, however, that the latter percentages are near the lower and upper limits of the physiological range.

Preliminary tests using 100 grams of iodinated protein per 100 pounds of feed caused marked decreases in body weight of the birds and 35 grams of iodinated protein per 100 pounds of feed depressed egg production over periods of months.

The increased egg production that results when iodinated protein of 3 per cent thyroxine potency is given in the predetermined optimal amounts is a measure of increased reproductive efficiency brought about by stimulation of the reproductive tissues of the ovary, both by direct action and indirectly by promoting a greater output of the hormones of the pituitary gland that are involved in this process. In a like manner the fertility of male birds can be improved by feeding a ration containing 0.01 to 0.04 per cent iodinated protein. It is known that during the summer months there is a seasonal decline in sperm production of male fowls. By feeding iodinated protein at this predetermined level such seasonal fluctuations in the fertility of male birds can be prevented, thus resulting in marked improvement in their breeding efficiency.

From the foregoing it will be observed that we have achieved the objects of our invention. We have provided a method of substantially increasing the growth rate of young fowls and of substantially increasing the egg production of pullets or mature hens, and the reproductive efficiency of male fowls. Iodinated protein of good quality can be cheaply produced in large amounts by the methods disclosed in our previous applications hereinabove referred to. The active material can be easily and properly administered by mixing it with the feed. This assures that the birds receive the requisite amount of iodinated protein regardless of their size or weight.

Having thus described our invention, we claim:

1. A method of increasing and sustaining egg production of fowls comprising feeding iodinated protein having 3 per cent the potency of synthetic thyroxine in an amount between .01 per cent and .04 per cent of the food consumed by the fowl.

2. A method of elevating and maintaining throughout the year in the blood stream of fowls of both sexes predetermined amounts of thyroid hormone such as to favorably influence growth, reproduction, sperm or egg production and other economic productive processes comprising feeding to the fowl approximately 10 grams of an iodinated protein 3 per cent as potent as synthetic thyroxine per 45.4 kg. of food.

3. A method of increasing the rate of growth of young fowls comprising feeding to the fowl iodinated protein 3 per cent as potent as synthetic thyroxine in an amount between .01 per cent and .08 per cent of the food consumed by the fowl.

4. A composition of matter for increasing body growth and feather growth comprising a poultry feed having incorporated therein from .01 to 0.1 per cent of an iodinated protein 3 per cent as potent as synthetic thyroxine.

5. A composition of matter for increasing egg production in fowls comprising a food having incorporated therein from .01 per cent to .04 per cent of an iodinated protein 3 per cent as potent as synthetic thyroxine.

6. A composition of matter for increasing egg production in fowls comprising a food having incorporated therein 10 grams of an iodinated protein 3 per cent as potent as synthetic thyroxine per 45.5 kg. of food.

CHARLES W. TURNER.
EZRA P. REINEKE.